United States Patent
Kato et al.

(10) Patent No.: US 7,602,779 B2
(45) Date of Patent: Oct. 13, 2009

(54) MICROPROCESSOR, NETWORK SYSTEM AND COMMUNICATION METHOD

(75) Inventors: Naoki Kato, Kodaira (JP); Fumio Arakawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 789 days.

(21) Appl. No.: 11/211,573

(22) Filed: Aug. 26, 2005

(65) Prior Publication Data

US 2006/0285555 A1      Dec. 21, 2006

(30) Foreign Application Priority Data

Jun. 17, 2005      (JP) ............................. 2005-178538

(51) Int. Cl.
*H04L 12/28* (2006.01)
*H04L 12/56* (2006.01)

(52) U.S. Cl. ...................................... 370/389; 370/400

(58) Field of Classification Search ................. 370/389, 370/392, 393, 395.21, 471, 474, 236.2, 254, 370/255, 400, 401, 419, 428, 429, 472, 475, 370/476
See application file for complete search history.

(56) References Cited

U.S. PATENT DOCUMENTS

| | | | | |
|---|---|---|---|---|
| 4,468,733 A | * | 8/1984 | Oka et al. | 710/312 |
| 5,640,508 A | * | 6/1997 | Fujiwara et al. | 714/30 |
| 6,378,064 B1 | * | 4/2002 | Edwards et al. | 712/227 |
| 7,406,086 B2 | * | 7/2008 | Deneroff et al. | 370/400 |
| 2003/0002438 A1 | * | 1/2003 | Yazaki et al. | 370/229 |
| 2003/0137981 A1 | * | 7/2003 | Tsai et al. | 370/392 |

FOREIGN PATENT DOCUMENTS

| JP | 06-085876 | 9/1992 |
|---|---|---|
| JP | 11-110089 | 10/1997 |

\* cited by examiner

*Primary Examiner*—Chirag G Shah
*Assistant Examiner*—Ashley L Shivers
(74) *Attorney, Agent, or Firm*—Stites & Harbison PLLC; Juan Carlos A. Marquez, Esq.

(57) ABSTRACT

A first object of the present invention is to reduce interrupt to a CPU which occurs when microprocessors that are connected by a network receive a packet from the network to efficiently operate the processors. A second object of the present invention is to provide a microprocessor and a communication method, which make it possible to reply a quick response to the microprocessor at the transmitting side. Each of the microprocessors includes the CPU and a communication module. The communication module includes a register that stores information which is managed by the microprocessor. The communication module compares information at a given bit position within the packet which is inputted through the network with information retained in the register, and determines whether a process corresponding to the packet reception is conducted by the CPU, or not, according to the comparison result.

13 Claims, 11 Drawing Sheets

MICROPROCESSOR, NETWORK SYSTEM AND COMMUNICATION METHOD

CLAIM OF PRIORITY

The present patent application claims priority from Japanese application JP 2005-178538 filed on Jun. 17, 2005, the content of which is hereby incorporated by reference into this application.

FIELD OF THE INVENTION

The present invention relates to a microprocessor having an interface that is connected to a network, and more particularly to microprocessors which are used for each of plural control units, respectively and conduct linkage operation with each other through the network, and a communication method between the respective microprocessors.

BACKGROUND OF THE INVENTION

For example, Japanese Patent Laid-Open No. H11-110089 discloses a structure in which there is provided a receiving packet discriminating means that is provided so as not to conduct restore from standby in a packet which is not addressed to a subject computer on standby, and an interrupt signal is generated only when it is discriminated that the packet is addressed to the subject computer in a computer that is connected to a LAN (local area network).

Also, Japanese Patent Laid-Open No. H06-085876 discloses an example of a communication control device having a microprocessor with a DMAC (direct memory access controller) that conducts transfer to a storage area not through a CPU (central processing unit). In this example, in the case of receiving data addressed to a subject microprocessor, the DMAC starts, and received data is automatically transferred to a transmitting/receiving buffer (storage device). Upon completing the transfer of data having a designated size, the CPU receives notification of completion by using interrupt.

SUMMARY OF THE INVENTION

In an electronic control device for an automobile, a control signal is generated on the basis of information that has been inputted from a sensor and then outputted to an actuator, and the actuator is operated on the basis of the control signal. The control device is equipped with a microprocessor and a driver IC. In recent years, there are plural electronic control devices, and linkage operation or data commoditizing communication is conducted among those plural electronic control devices in the interior of the automobile. For that reason, the plural electronic control devices are connected to each other through the network to constitute a network system. In order to connect with the network, a communication IC and a microprocessor are used for the electronic control device. Alternatively, a microprocessor having a communication module is used for the electronic control device. In this case, the microprocessor functions as a node in the network system. Hereinafter, a description will be given of a microprocessor having a general communication module.

FIG. 15 shows an example in which plural microprocessors (MP) 2a, 2b, and 2c are connected to a network 1, and more particularly shows the inner structure of only the microprocessor 2a in detail. The microprocessor 2a has a CPU 5, an interrupt controlling unit (INT) 6, an inner storage device (RAM) 7, and a communication module (COM) 3 connected to an inner bus (Bus) 4. In addition, the microprocessor 2a may frequently have a peripheral module such as an input/output port, a time unit, or an A/D converter. In this drawing, only the structure necessary for description is shown.

The communication module 3 outputs data to the network 1 from a transmitter (tr) 8, and receives data from the network 1 by a receiver (rc) 9. At the time of transmitting data, the communication module 3 makes data, which has been written in a transmission buffer (trbuf) 10 through the bus 4 according to a command of the CPU 5 or the like, packets in conformity to a communication convention by a packet generator (pcgen) 11. Then, the communication module 3 outputs the data from a transmitter 8.

The receiving operation will be described below in more detail with reference to the structural diagram of FIG. 15 and a processing flowchart shown in FIG. 16. In FIG. 16, the respective processes of the communication module 3, the interrupt controlling unit 6 and the CPU 5 within the microprocessor 2a are separately shown. The received data is received by the receiver 9 (P101), and a packet is recovered by a packet recovery unit 12 (P102). An address analysis unit 16 determines whether the recovered packet is a packet addressed to the subject microprocessor, or not, from address information that is embedded at a given bit position of the recovered packet data (P103). In this specification, the address information may designate a single microprocessor, or may represent an address of the plural microprocessors. Also, it is possible that identification information (message ID) inherent to the message is included within the packet instead of the destination information, the message ID to be received is stored at the receiving processor side in advance, and it is determined whether the packet is received, or not, according to the correspondence of the message ID. In this example, it is determined whether the packet is received, or not, including the above operation in the address analysis unit 12.

In the case where it is determined that the packet is addressed to the subject microprocessor, the received data is stored in a receiving buffer (rcbuf) 14, and an interrupt request signal (intreq) is asserted (made in an active state) (P104). In the case where it is unnecessary to receive the packet, the packet is rejected (P105). Upon receiving the interrupt request signal intreq, the interrupt controlling unit 6 determines whether the interrupt request is transmitted to the CPU 5 according to various conditions, or not (P106). In the case where the conditions are met, the interrupt signal intsig is asserted with respect to the CPU 5 (P107). The CPU 5 that has received the interrupt signal interrupts a process (P108) that has been executed up to now, and executes an interrupt process that has been determined in advance for each of the interrupt factors (P110). A register group necessary to restore to the process (P108) that has been executed up to now must be saved to the storage device 7 (P109). Upon completion of the interrupt process (P110), the saved register group is restored (P111), and the operation is restored to the interrupted process (P108).

The matter common to the above microprocessor and the related art disclosed in the above two Japanese Patent Laid-Open applications resides in that in the case of receiving the packet addressed to the subject microcomputer, the CPU receives notification of the fact of data reception by generating the interrupt signal. As a result, the CPU interrupts the process that has been conducted up to now, and executes a predetermined process with respect to the received data. Also, as a method of knowing the arrival of the received data, there is applied a method that is called "polling" in which the CPU inquires of the communication module whether there is the arrival of new data, or not, every given time.

Incidentally, when the CPU receives notification of interrupt by receiving the packet addressed to the subject microcomputer as described above, an overhead that is not necessary in the original process such as register save or register restore is generated. For that reason, in the operation of the microprocessor described with reference to FIGS. 15 and 16, in order to reduce the interrupt to the CPU at the time of receiving the packet as much as possible, the communication module determines whether the packet is addressed to the subject microcomputer, or not. As a result, the packet irrelevant to the subject microcomputer is rejected by the communication module, thereby making it possible not to conduct useless interrupt with respect to the CPU. This is applied to both of a case of Japanese Patent Laid-Open No. H11-110089 which does not use DMAC and a case of Japanese Patent Laid-Open No. H06-085876 which uses DMAC. However, in the case where it is determined that the packet is addressed to the subject microcomputer, the interrupt to the CPU is not prevented in any methods.

On the other hand, in the case of the polling process that does not use interrupt, the communication module is inquired of whether the data has been received, or not, between the processes of the CPU, thereby making it possible to prevent the interrupt of the process. However, it is impossible to process the received package that must be urgently processed at the same time as data arrival. Also, there arises such a problem that useless inquiry and reply are conducted between the CPU and the communication module in spite of no data arrival. In particular, in the case of conducting control that requires a real time property, a delay of the process from the arrival of the received data may induce a fatal problem on the system operation. For that reason, the polling process is not general, but the interrupt operation is normally used.

As described above, in the case where it is determined that the packet that has been received by the communication module is addressed to the subject microcomputer, it appears that the interrupt to the CPU is not prevented from occurring. However, as a result of analysis by the inventors, even in the case where the packet is addressed to the subject microcomputer, it has been found that the interrupt to the CPU may be useless. A case in which the interrupt to the CPU is useless will be described with reference to the control of an automobile.

In FIG. 15, the rotational speed of an engine is detected by the microprocessor 2c, and the rotational speed of the engine is transmitted to the microprocessor 2a by a communication packet. The microprocessor 2a receives notification that the rotational speed of the engine which is equal to or higher than a given threshold value and stored in a storage device within the microprocessor 2a. Only in this case, a given process is conducted. In this case, since the destination of the packet is the microprocessor 2a, the interrupt request is asserted due to the correspondence of the addresses in the communication module 3 of the microprocessor 2a. The CPU 5 receives notification of interrupt from the interrupt controlling unit 6, the process that has been executed up to now, and a process corresponding to the interrupt is executed.

In the interrupt process, the engine rotational speed data within the packet is compared with a threshold value that is stored in the storage device. As a result, in the case where the rotational speed is equal to or higher than the threshold value, a given process is executed. However, in the case where the rotational speed is lower than the threshold value, the control process is not conducted. That is, the interrupt to the CPU 5 is executed only in order to make judgment that no control process is conducted.

In addition, there is a case in which the same useless receiving interrupt occurs even when considering another control. A description will be given of an example in which a temperature of a first control device is inputted to the microprocessor 2c from a temperature sensor that is connected to the microprocessor 2c, and the temperature information of the first control device is transmitted to the microprocessor 2a by a communication packet. It is assumed that a temperature of a second control device which is controlled by the microprocessor 2a is inputted to the microprocessor 2a from another temperature sensor. As the interrupt process, the microprocessor 2a compares the transferred temperature of the first control device with the temperature of the second control device, and controls the second control device only when a predetermined relationship (for example, the temperature of the second device is higher than the temperature of the first device) is satisfied. Similarly, in this example, there may occur a case in which the control process of the second control device is not executed as a result of comparing the temperature although the interrupt is asserted by the correspondence of the addresses to interrupt the process that is in execution. Like to the above example, the interrupt to the CPU is conducted only in order to determine that no control process is conducted. If a case in which the temperature of the first control device is higher than the temperature of the second control device is abnormal, the unnecessary interrupt periodically occurs because this case is a phenomenon that rarely occurs, thereby leading to the deterioration of the processing performance.

Subsequently, let us consider an example in which a processing load is dispersed among the microprocessors that are connected by the network. In the case where the microprocessor 2c determines that the CPU load of the microprocessor 2c exceeds a given value, the microprocessor 2c requests the other microprocessors 2a and 2b to execute the process. In this case, an inquiry packet in which a requested throughput such as an execution time of a task is stored is transferred to the microprocessors 2a and 2b through a simultaneous transmissive communication. An executable microprocessor replies a packet indicating that the microprocessor accepts the request, and an unexecutable microprocessor does not reply the packet. The microprocessor 1a detects that the destination to the microprocessor 1a is included in the packet, and conducts the interrupt to the CPU 5. The CPU 15 interrupts the process that is in execution, and compares the throughput of the execution request task with affordance of the microprocessor 1a. In the case where the microprocessor 1a determines that the execution is enabled, the microprocessor 1a replies the packet that receives the process. However, in the case where the microprocessor 1a determines that the acceptance is disenabled (in the case where the affordance is small), the microprocessor 1a does not reply the packet. In this example, the process that is in execution is interrupted only for judgment that the packet is not replied.

The present invention has been made to solve the above problems with the related art, and therefore a first object of the present invention is to reduce interrupt to a CPU which occurs when microprocessors that are connected by a network receive a packet from the network to efficiently operate the processors. In more detail, the first object of the present invention is to provide a microprocessor, a network system using the microprocessor, and a communication method, which do not conduct useless interrupt occurring when it is unnecessary to execute the process, focusing attention on the fact that there is no case in which it unnecessary to execute the process even in the case where it is determined that the received packet is addressed to the subject microprocessor.

Also, there arises such a problem that the start of the process is delayed due to an overhead such as a register save in the case where the interrupt to the CPU is generated, and the interrupt process is executed. In the case where the microprocessor at the transmitting side requests the reply of a quick response, the CPU interrupt process of the receiving side microprocessor may not meet with the request response. Under the circumstances, a second object of the present invention is to provide a microprocessor, a network system using the microprocessor, and a communication method, which make it possible to reply a quick response to the microprocessor at the transmitting side not through the CPU interrupt process.

The above first object of the present invention can be effectively achieved by the communication module which includes a register that stores first information which is managed by the microprocessor, and a comparator that compares second information at a given bit position within a received packet with the first information that is stored in the register, and determines whether the CPU conducts data process, or not, according to a comparison result. With the provision of the register and the comparator, since the communication module can determine whether the CPU conducts the data process, or not, it is unnecessary to conduct the interrupt to the CPU for judgment.

The above second object of the present invention can be effectively achieved by including an information bit group that requests to conduct the packet reply directly from the communication module not through the CPU in the packet. When the communication module determines that the request task is executed with reference to the information bit group, the communication module conducts the packet reply in association with the judgment.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENTS

Now, a description will be given in more detail of a microprocessor, a network system, and a communication method according to the present invention with reference to the embodiments shown in the attached drawings. In all of the drawings for explaining the embodiments, the same symbols represent identical or similar members, and duplicate description will be omitted.

First Embodiment

Figure 1A:
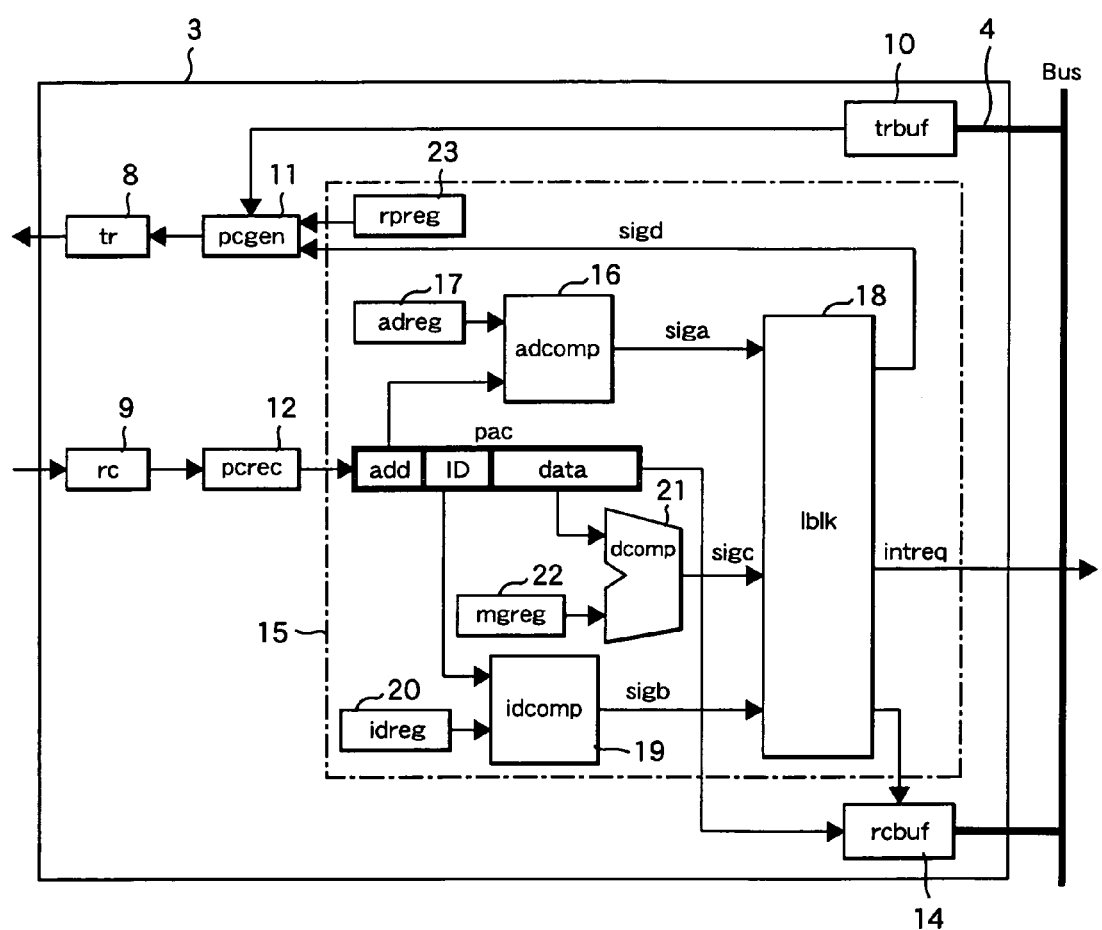
FIG. 1A is a structural diagram for explaining a communication module of a microprocessor according to a first embodiment of the present invention.
Figure 1B:
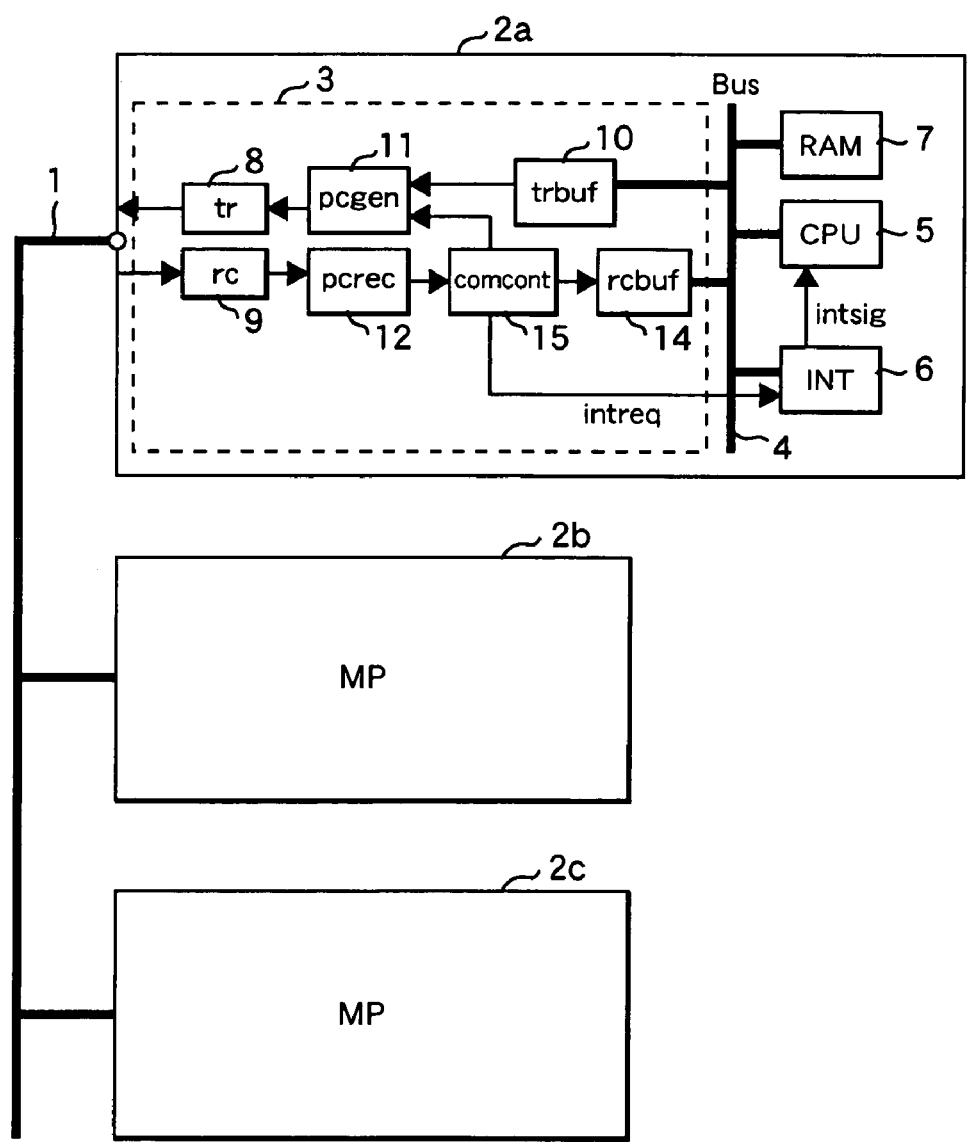
FIG. 1B is a structural diagram for explaining the microprocessor and a network according to the first embodiment of the present invention.

A first embodiment of the present invention will be described with reference to FIGS. 1A, 1B, and 2. FIG. 1A shows an inner structure of a communication module 3 of a microprocessor according to this embodiment, and FIG. 1B shows a network system of this embodiment in which a microprocessor 2a including a communication module 3 according to this embodiment, and plural microprocessors 2a to 2c are connected to a network 1. In the microprocessor 2a, an inner bus (Bus) 4 is connected with a CPU 5, an interrupt controlling unit (INT) 6, an inner storage device (RAM) 7, and a communication module 3. Each of the microprocessors 2 functions as a node in the network system.

This embodiment exemplifies load dispersion among plural microprocessors 2a to 2c which are connected to the network 1. When a microprocessor whose load becomes a given value or higher requests another microprocessor to execute the self-task, the microprocessor transmits a packet that inquires whether the self-task can be accepted by another microprocessor, or not, in the broadcast communication. The acceptable microprocessor replies by using a reply packet in order to report that the self-task can be accepted. In the network system, various packets are transmitted or received among the microprocessors other than the inquiry packet.

In FIG. 1A, at the time of transmitting data, the communication module 3 makes data, which has been written in a transmission buffer (trbuf) 10 through the bus 4 according to a command of the CPU 5 or the like, packets in conformity to a communication convention by a packet generator (pcgen) 11. Then, the communication module 3 outputs the data from a transmitter (tr) 8.

Subsequently, the receiving operation will be described in more detail. The received data is received by a receiver (rc) 9, and a packet is recovered by a packet recovery unit (pcrec) 13. A recovered packet pac is shown in the substantially center of FIG. 1A.

In a communication through the network, data to be transmitted is minutely sectioned, and a format of the sectioned masses is defined in each of protocols. One mass of data is called "packet" or "frame", and nominal designations are chosen according to a hierarchy that is defined by the protocol. In a second data link layer, the data mass is called "frame", and in the case of directing the data mass not depending on the hierarchy, the data mass is frequently called "packet". In the communication module 3, because a physical layer of the lowermost layer and the data link layer of the second layer are processed, it may be preferable that the data mass is called "frame". However, in the present specification, a specific protocol is not assumed, and the data mass is standardized by a term "packet". The packet is made up of a header and a payload. The head is a portion including the destination and ID of a message as information necessary to transfer the packet, and the payload is a portion including data per se to be transmitted. Within the packet pac of FIG. 1A, identification information "ID" for identifying the message, individually, is stored in the header in addition to address information "add", and data "data" is stored in the payload. In this embodiment, a specific ID that is given only to a packet of a task execution request is set as the above message identification information ID. In addition to the above areas, there are an area indicative of a packet separation, an area for taking synchronization, and an area for error check within the packet. However, those areas are unnecessary for description in FIG. 1A, and therefore will be omitted from the drawing.

An address analysis unit (adcomp) 16 inputs the address information "add" within the packet and a value of an address register (adreg) 17 that stores the self-address therein, determines whether the packet is addressed to the subject microprocessor, or not, and supplies an address analysis result signal siga to the process determination unit (1blk) 18. The address analysis unit 16 sets the address analysis result signal siga to 1 in the case where the packet is addressed to the subject microprocessor, but to 0 in the case where the packet is not addressed to the subject microprocessor.

A message ID analysis unit (idcom) 19 inputs the message identification information ID within the packet and a value of the message ID register (idreg) 20, and supplies a message ID analysis result signal sigb that determines whether the packet is a specific message packet, or not, to the process determination unit 18. In this embodiment, as described above, the specific ID is given only to the packet of the task execution request, and the same ID is stored in the message ID register (idreg) 20. When the message ID analysis unit 19 detects the correspondence of those IDs, the message ID analysis unit 19 sets the message ID analysis result signal sigb to 1. In other cases, the message ID analysis unit 19 sets the message ID analysis result signal sigb to 0.

A data comparator (dcomp) 21 inputs a value of data "data" (process time) within the packet and a value of a CPU affordance time register (mgreg) 22 (CPU affordance time), compares those values with each other, and supplies a comparison result signal "sigc" to the process determination unit 18. In the case where the received packet is a packet of the task execution request, a process time required to execute the task is stored in the data portion of the packet. That is, the process time which is information for conducting comparison by the data comparator 21 is stored in the payload together with the data. Also, in the CPU affordance time register 22 is stored a spare time within a given period of the microprocessor 2a, that is, a limit time of the accepted throughput as the CPU affordance time. Normally, in the case where the task start is requested in the microprocessor 2, scheduling that determines an order for executing the task is conducted by OS. For example, it is possible that the CPU affordance time is calculated according to the scheduling result, and the calculation result is written in the CPU affordance time register 22 every time scheduling is conducted. Alternatively, it is possible that a load status of the microprocessor is periodically monitored, the CPU affordance time is calculated every time monitoring is conducted, and the calculation result is written in the CPU affordance time register 22. The comparison result signal "sigc" makes the CPU affordance time larger than the throughput (requested execution time) required by the task, that is, 1 when the throughput is acceptable.

The process determination unit 18 inputs the above three signals siga, sigb, and sigc, outputs the interrupt request signal intreq and the packet reply command signal sigd, and controls the transmission and rejection of the data that has been stored in a receiving buffer (rebuff) 14. The interrupt request signal intreq is inputted to the interrupt controlling unit 6 of the microprocessor 2a, and the interrupt signal intsig is asserted to the CPU 5 from the interrupt controlling unit 6. The packet reply command signal sigd is a signal for extracting the corresponding contents from the reply packet register (rpreg) 23 with respect to the packet generator 11 within the communication module 3, and instructing the transmission of the reply packet. The destination of the reply packet is read from an address indicative of a source node from an original received packet, which is omitted from the drawing.

The communication processing unit (comcont) 15 shown in FIGS. 1A and 1B is made up of the above address analysis unit 16, the address register 17, the process determination unit 18, the reply packet register 23, the message ID analysis unit 19, the message ID register 20, the data comparator 21, and the CPU affordance time register 22.

In the above description, the message identification information ID included in the packet is represented as information that requests to conduct the packet reply from the communication packet at the same time. Accordingly, the communication method of this embodiment in which data is mutually transmitted and received among plural nodes (microprocessors) which are connected by the network is characterized as follows. That is, the received packet includes an information bit group that requests to conduct the packet reply directly from the communication module not through the CPU.

Figure 2:
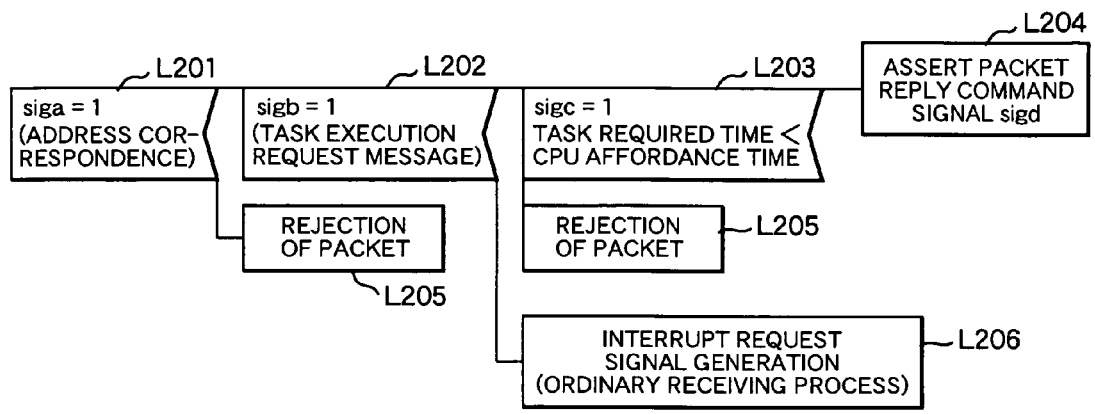
FIG. 2 is a diagram for explaining a function PAD of a process judging unit according to the first embodiment.

The PAD (problem analysis diagram) of the determining operation of the process determination unit 18 is shown in FIG. 2. In the case where the address analysis result signal siga is 0, the process determination unit 18 rejects the packet (L205) When the address analysis result signal is 1, subsequent process is conducted (L201). The rejection of packet means that the packet is returned to a receiving wait state such that the packet that has been stored in the receiving buffer is rejected. In the case where the address analysis result signal is 1, the process is divided according to the message ID analysis result signal sigb (L202). In the case where the message ID analysis result signal sigb is 0, because the packet is a packet addressed to the subject microprocessor which is not a task execution request packet, the interrupt request signal intreq is asserted as an ordinary receiving process (L206). In the case where the message ID analysis result signal sigb is 1, because the packet is the task execution request packet, the determination process (L203) using the comparison result signal sigc is conducted. In the case where the comparison result signal sigc is 1, that is, in the case where the CPU affordance time is larger than the requested execution time of the request task, the packet reply command signal sigd is asserted (L204). As a result, as described above, the reply packet is outputted from the packet generator. As described above, the process indicated by PAD in FIG. 2 is readily realized by a logic circuit that is small in the circuit scale.

Through the above structure and operation, since the communication control unit 15 determines whether the packet can be accepted, or not, at the time of receiving the task execution request packet for load dispersion, there occurs no interrupt that requests the determination with respect to the CPU 5. Accordingly, the operation efficiency of the CPU 5 is not deteriorated. Also, in the case where the packet can be accepted, the reply packet indicating that the packet can be accepted is replied immediately not through the CPU 5. As described above, the determination and the generation of the packet reply command are conducted by the communication module 3 without determining whether the packet can be received by the CPU 5, or not (when this determination is conducted, it is naturally necessary that the CPU 5 generates and transmits the reply packet transmission command). As a result, the first object of not supply a load to the CPU and the second object of replying the packet to the source immediately are achieved.

The information that is managed by the microprocessor is the CPU affordance time in the above embodiment, however, the present invention is not limited to this CPU affordance time. As described above, the present invention is applicable to various arbitrary information according to the intended purpose, such as the rotational speed or the temperature.

Second Embodiment

Figure 3:
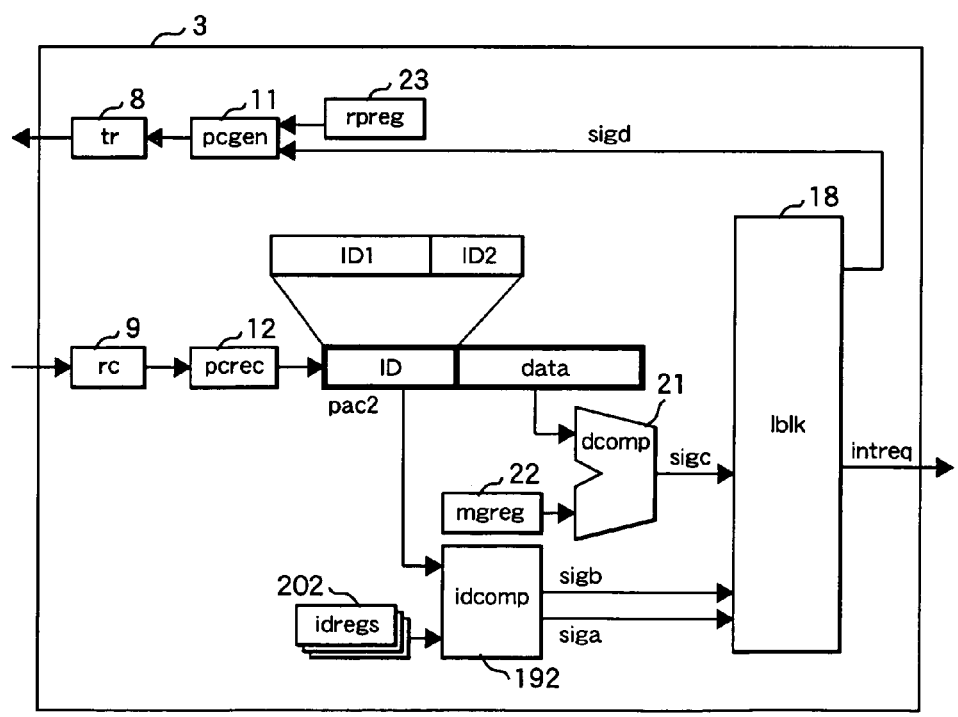
FIG. 3 is a structural diagram for explaining a communication module according to a second embodiment of the present invention.

FIG. 3 shows a second embodiment of the present invention. In this embodiment, the structure of the packet is different, and the communication method is different according to the packet structure as compared with the first embodiment. Other structures are identical with those in the first embodiment. The inner structure of the communication module 3 of the microprocessor 2 is shown in FIG. 3 as in the first embodiment. The transmission buffer 10, the receiving buffer 14, and the bus 4 are omitted from the drawing. Hereinafter, differences from the first embodiment will be mainly described.

The communication packet pac2 according to this embodiment does not have the destination information but have a message ID given as inherent information in each of the messages. There is applied a communication method in which not destination information but the message ID to be received by the subject microprocessor is stored to determine the reception in the receiving node. For example, the CAN (control area network) that is widely used in an in-vehicle LAN has a frame structure of this type, and has a message ID area of 11 bits.

In this embodiment, a message analysis unit 192 conducts the determination of whether the packet is addressed to the subject microprocessor, or not, which is conducted by the address analysis unit 16 in the first embodiment, and the determination of whether the packet is a specific packet (task execution request packet), or not, which is conducted by the message ID analysis unit 19 in the first embodiment. The message ID analysis unit 192 compares a higher-order bit ID1 of the message ID unit of, for example, the packet pac2 shown in FIG. 3 with the message ID register group (idregs) 202 to determine whether the packet should be received, or not, and generates the same address analysis result signal siga as that in the first embodiment. In addition, the message ID analysis unit 192 compares a lower-order ID2 of the message ID unit of the packet with the message ID register group 202 to determine whether the packet is a specific message packet, or not, and generates the same message ID analysis result signal sigb as that in the first embodiment. The address analysis result signal siga and the message ID analysis result signal sigb are inputted to the process determination unit 18. The following operation is identical with that in the first embodiment, and therefore its description will be omitted.

According to this embodiment, the first object of the present invention that no load is supplied to the CPU, and the second object of the present invention that the packet is replied to the source immediately are achieved even in the case where the communication packet does not have the destination information but has the message ID that is given as inherent information in each of the messages.

Third Embodiment

Figure 4:
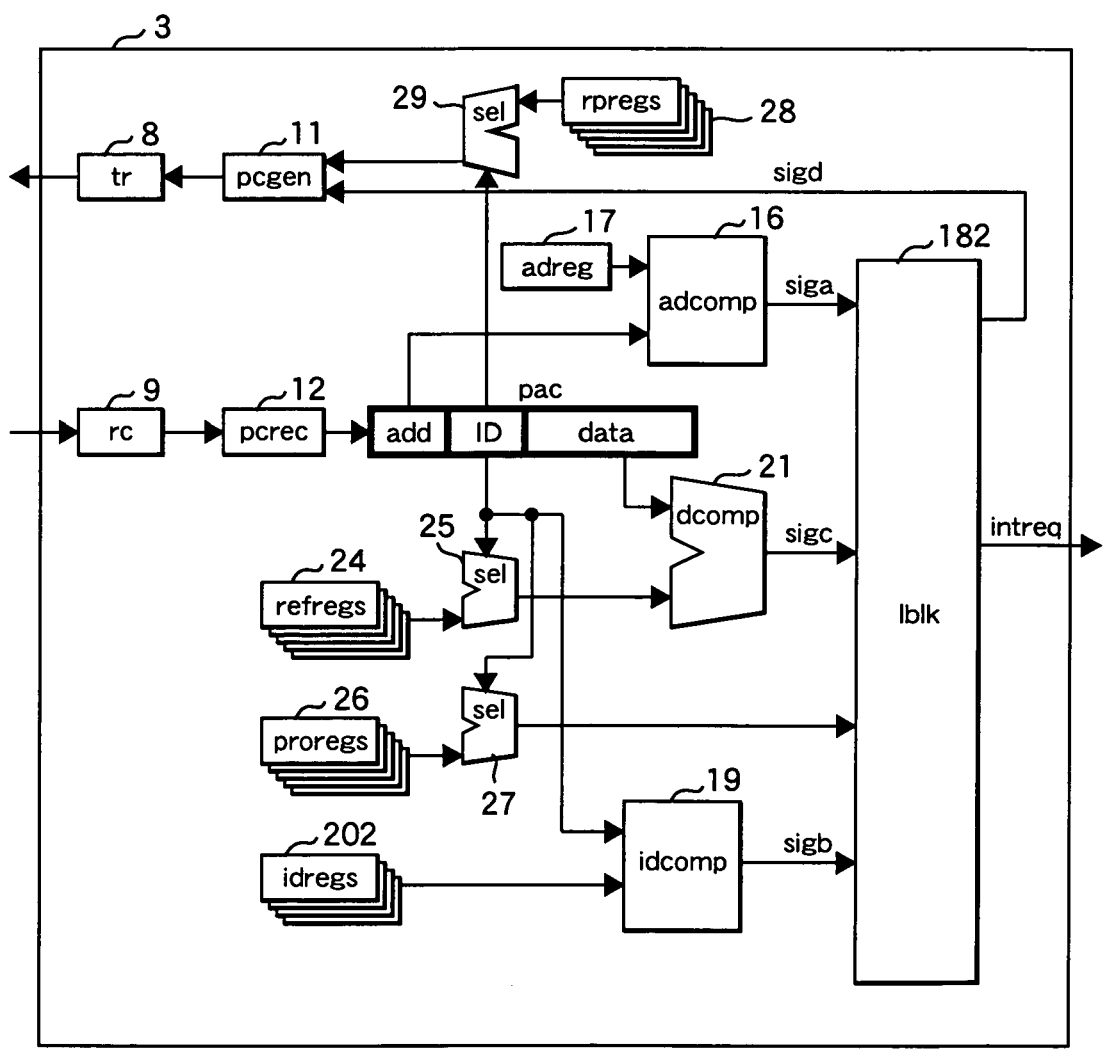
FIG. 4 is a structural diagram for explaining a communication module according to a third embodiment of the present invention.

FIG. 4 shows a third embodiment of the present invention. In the first and second embodiments, the task execution request packet is applied. However, in this embodiment, there is plural pieces of information that are managed by the microprocessor, and the determination of the processing method is conducted with respect to the plural packets for the plural pieces of information by comparing the data within the packet with the register data.

In this embodiment, the identification information ID of the individual messages is stored within the packet pac for each of information in addition to the address information "add" and the data "data" area as in the first embodiment. The present invention is not limited to the packet having the destination information add, but applicable to the packet having no destination information add.

In FIG. 4, the address analysis unit 16 inputs the destination information add within the packet and a value of the register 17 that stores the self-address therein, determines whether the packet is addressed to the subject microprocessor, or not, and supplies the address analysis result signal siga to a process determination unit 182.

The message ID analysis unit 19 inputs the message identification information ID within the packet and a value of the message ID register group 202, and supplies the message ID analysis result signal sigb that determines whether the packet is a specific message packet, or not, to a process determination unit 182. In this embodiment, specific IDs are given, for example, a packet of the task execution request, and a packet that conducts plural specific processes such as an engine rotational speed data transfer packet, and the same IDs as those specific IDs are stored in the message ID register group 202. The message ID analysis unit 19 sets the message ID analysis result signal sigb to 1 in the case where the message identification information ID within the packet coincides with any ID of the message ID register group 202, and sets the message ID analysis result signal sigb to 0 in other cases.

The data comparator 21 inputs a value of the data "data" within the packet, and a value selected from a reference data register group (refregs) 24, compares those values with each other, and supplies a comparison result signal sigc to the process determination unit 182. The reference data register group 24 is provided in correspondence with the specific message, and the identification information ID corresponding to the message identification information ID within the received packet is selected by a selector (sel) 25, and then supplied to the data comparator 21. The reference data register group 24 is written by the CPU 5 as needed as with the CPU affordance time register 22 in the first embodiment. The comparison result signal sigc indicates whether the packet data is larger than, smaller than, or equal to the value of the selected reference data register group 24 as the comparison result. For distinction even in the equal case, the comparison result signal sigc becomes a 2 bit signal.

The process determination unit 182 inputs a value of the register that is selected from a processing method determination register group (progregs) 26 in addition to the above three signals siga, sigb, and sigc. The process determination register group 26 corresponding to the message identification information ID within the received package is selected by the selector 27 as with the reference data register group 24. The process determination unit 182 outputs the interrupt request signal intreq and the packet reply command signal sigd as in the first embodiment. The packet reply command signal sigd instructs the packet generator 11 within the communication module to transmit one content selected from the reply packet register group (rpregs) 28. The reply packet register group 28 corresponding to the message identification information ID within the received packet is selected by the selector 29 as with the process determination register group 26 and the reference data register group 24.

Figure 5:
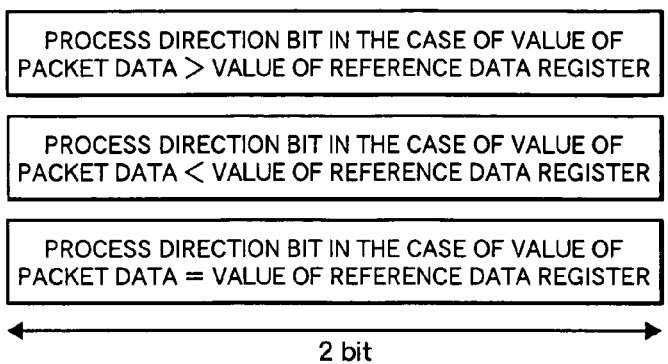
FIG. 5 is a structural diagram for explaining a processing method determination register used in the third embodiment.

The determination operation of the process determination unit 182 is identical with that shown in FIG. 2, and the processing method is determined by the address analysis result signal siga and the message ID analysis result signal sigb. A difference from the first embodiment resides in the determination process using the comparison result signal sigc. In order to select the processing method flexibly corresponding to the comparison result for each kind of the packets from (1) the rejection of packet, (2) the interrupt request signal generation, and (3) the packet reply, a value of the processing method determination register group 26 is inputted. An example of the processing method determination register group 26 is shown in FIG. 5. The process determination register 26 consists of three areas corresponding to the result of comparing a value of the packet data "data" with a value of the reference data register 24. The above processes are directed by the 2-bit values, respectively. For example, the rejection of packet is selected in the case of (00), the interrupt request signal generation is selected in the case of (01), and the packet reply is selected in the case of (10).

As an example, a description will be given of a case of the task execution request packet according to the first embodiment. In this case, a value of the packet data "data" is a requested throughput of the task, and the CPU affordance time is stored in the reference data register 24. In the case where the CPU affordance time is large as in the first embodiment, the packet reply process is conducted, and the rejection of packet is conducted in other cases. (00) indicative of the packet rejection process is stored in the process direction bit of the processing method determination register 26 with respect to the task execution request packet in the case where the value of the packet data is larger than the value of the reference data register. Similarly, in the case where the value of the packet data is equal to the value of the reference data register, (00) indicative of the rejection of the packet is similarly stored in the process direction bit. In the case where the value of the packet data is smaller than the value of the reference data register, (10) indicative of the packet reply process is stored in the process direction bit.

As another packet example, a case in which the rotational speed of the engine is transmitted as the data within the packet will be described. In the case where the engine rotational speed exceeds a given value (for example, 6,000 r.p.m.), the CPU conducts a given process in the microprocessor that receives the data, and it is unnecessary to conduct the process in other cases. A threshold value 6,000 of the engine rotational speed is stored in the reference data register 24 corresponding to the ID of the packet. Also, (01) indicative of the interrupt request signal generation is stored in the process direction bit of the processing method determination register in the case where the value of the packet data is larger than the value of the reference data register, and (00) indicative of the rejection of packet is stored in other areas. This makes it possible to execute the process different in each of the packets. The process determination unit 182 determines whether the interrupt request signal intreg is asserted, the packet reply command signal sigd is asserted, or both of the interrupt request signal intreg and the packet reply command signal sigd are not asserted, according to the value of the processing method determination register 26 and the comparison result signal sigc.

This embodiment achieves the first object of the present invention that no load is supplied to the CPU, and the second object of the present invention that the packet is replied to the source immediately, even in the case where plural pieces of information are managed by the microprocessor.

Fourth Embodiment

Figure 6:
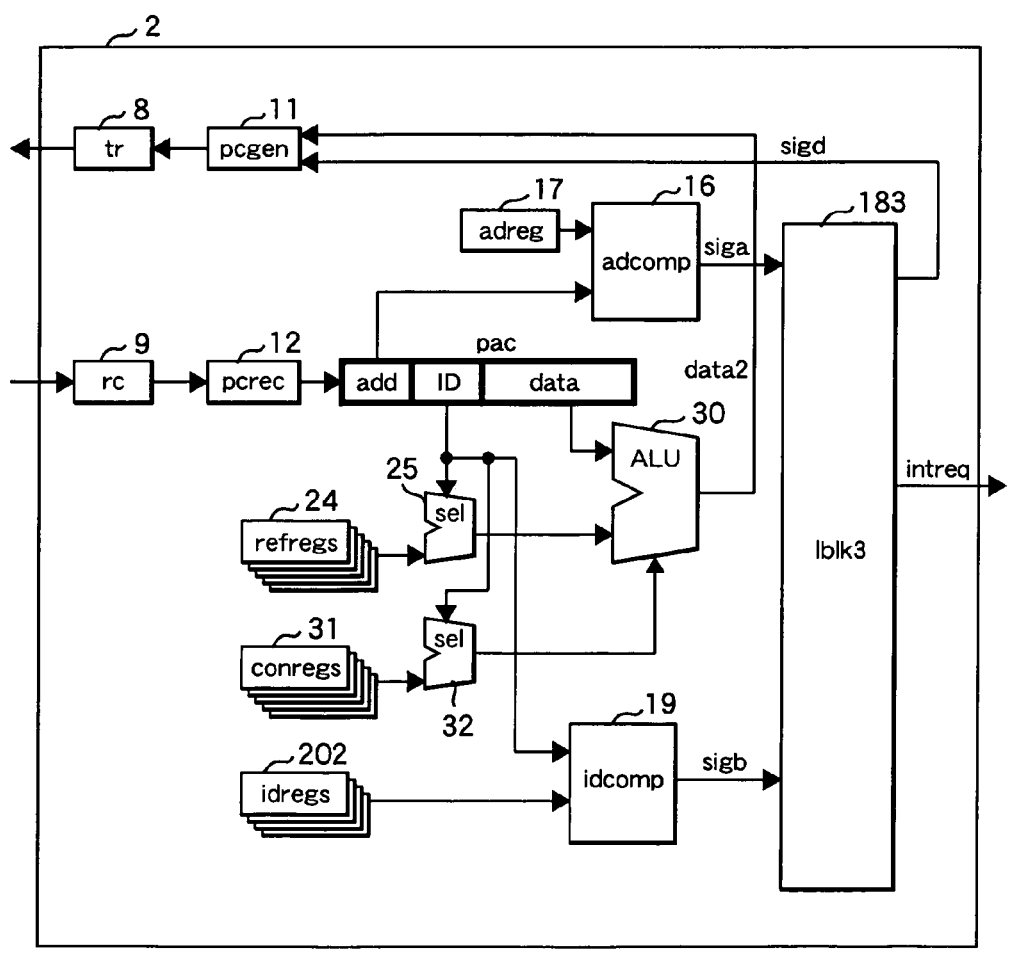
FIG. 6 is a structural diagram for explaining a communication module according to a fourth embodiment of the present invention.

FIG. 6 shows a fourth embodiment of the present invention. In the above respective embodiments, in the case of receiving a specific packet, the comparator 21 within the communication module 3 compares the value of data within the packet with the value of the register, and determines the processing method. In the communication module 3 of the microprocessor according to this embodiment, as shown in FIG. 6, the comparator 21 is replaced by an arithmetic logic unit (hereinafter referred to as "ALU") 30. The ALU 30 has the functions of conducting the arithmetic operation and logic operation, and changes over those functions according to a control signal. Data within the packet and the value of the register are inputted to the ALU 30, and the operation results of the ALU 30 is replied by the packet. As in the first embodiment, the identification information ID of the individual messages is stored within the packet pac in addition to the address information "add" and the data "data" area. The present invention is not limited to the packet having the address information "add", and applicable to the packet having not address information "add".

Referring to FIG. 6, the address analysis unit 16 inputs the address information "add" within the packet pac and the value of the register 17 that stores the self-address therein, determines whether the packet is addressed to the subject microprocessor, or not, and supplies the address analysis result signal siga to the process determination unit 183.

The message ID analysis unit 19 inputs the message identification information ID within the packet pac and the value of the message ID register group 202, and supplies the message ID analysis result signal sigb that determines whether the package is a specific message packet, or not, to the process determination unit 183.

The ALU 30 selects the data "data" within the packet pac and one data of the reference data register group 24, inputs both of data, and conducts arithmetic operation. The arithmetic result data2 is supplied to the packet generator 11 in the form of packets. As in the third embodiment, the reference data register group 24 is provided for the specific messages, and data corresponding to the message identification information ID within the received packet is selected by the selector 25. The ALU 30 has an ALU control register group (conregs) 32. A value of the ALU control register group 32 is inputted to the ALU 30 as a signal that controls the operation of the ALU 30. The ALU control register group 32 corresponding to the message identification information ID within the received packet is selected by the selector 32 as with the reference data register group 24.

The process determination unit 183 rejects the packet when the address analysis result signal siga is 0 as in the above embodiments. Also, in the case where the message ID analysis result signal sigb is 0, the interrupt request signal intreq is asserted as the receiving process of the ordinary packet. In the case where the message ID analysis result signal sigb is 1, the packet reply command signal sigd is asserted. The packet generator 8 inputs the arithmetic result data2, and in the case where the packet reply command signal sigd is asserted, the arithmetic result data2 is replied to the packet generator 8 in the form of packets.

According to this embodiment, the CPU 5 does not process the specific packet, but arithmetic operation is conducted by the communication module 3, and the result can be replied at a high-speed response. In this embodiment, the provision of the ALU 30 as the arithmetic function is exemplified. In the case where an increase in the circuit scale can be permitted, there can be used a dedicated arithmetic unit that is higher in performance than the ALU 30, a small scaled CPU that can execute program, or a circuit that can dynamically reconstruct the function. As a result, it is possible to deal with the received packet that must be subjected to a high-grade process, and the load on the main CPU 5 can be further reduced.

Fifth Embodiment

Figure 7:
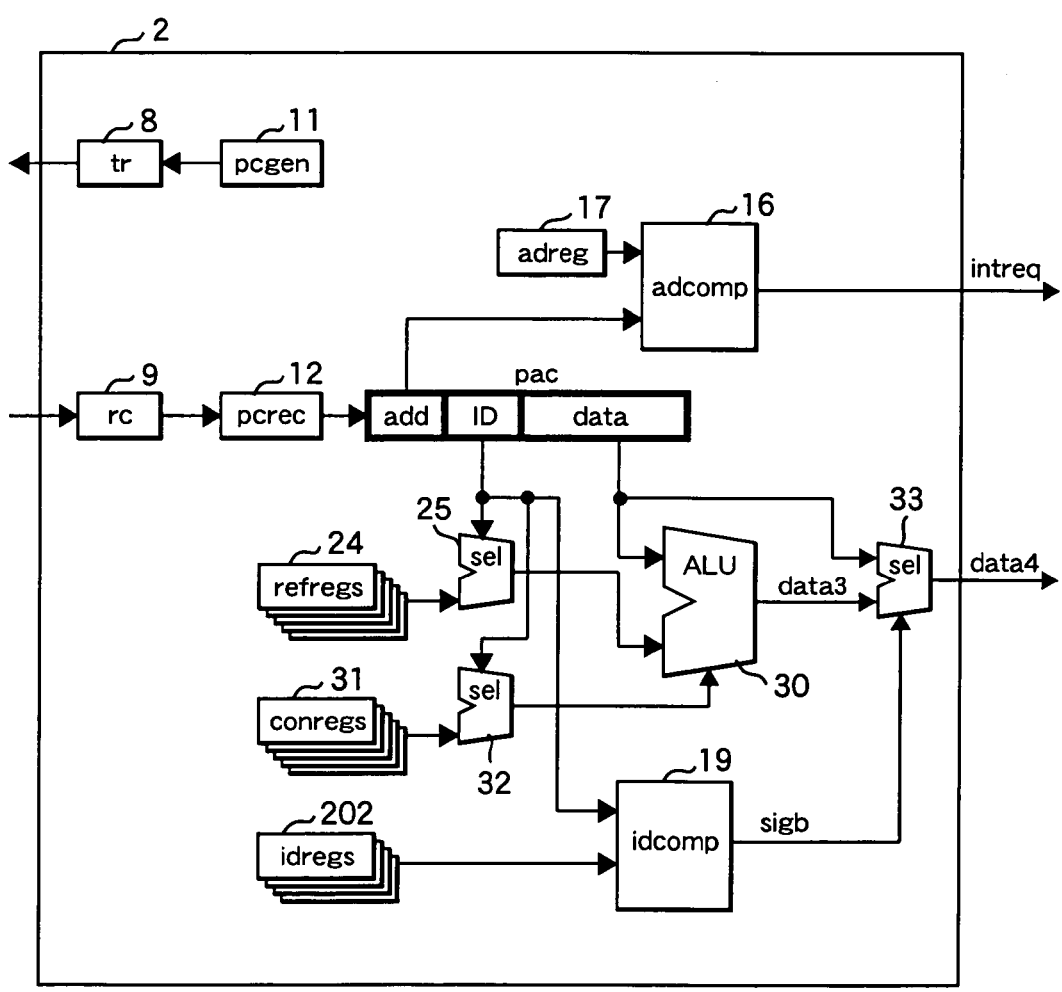
FIG. 7 is a structural diagram for explaining a communication module according to a fifth embodiment of the present invention.

FIG. 7 shows a fifth embodiment of the present invention. In this embodiment, there is provided the ALU 30, the data within the packet and the value of the register are inputted to the ALU 30 as in the fourth embodiment, and arithmetic operation is conducted by the ALU 30. In the fourth embodiment, the arithmetic result data2 is replied to the packet generator 11 in the form of packets. On the other hand, in this embodiment, as shown in FIG. 7, the arithmetic result is outputted to the interior of the microprocessor from the communication module 3 as shown in FIG. 7. The arithmetic result is processed by the CPU 5 although being not shown in FIG. 7. Also, in this embodiment, an output of the address analysis unit 16 is used as the interrupt request signal. That is, the interrupt request signal Intreq is asserted with respect to the packet of the address correspondence. An object of this embodiment is not to suppress the interrupt to the CPU 5 as in the above embodiments, but to reduce a load on the CPU 5 by allowing a part of the process after receiving the packet by the CPU 5 to be conducted by the ALU 30 of the communication module 3. The identification information ID of the individual messages is stored within the packet pac in addition to the address information "add" and the data "data" area as in the first embodiment. The present invention is not limited to the packet having the destination information "add", but applicable to the packet having no destination information "add".

In FIG. 7, the address analysis unit 16 inputs the address information "add" within the packet pac and a value of the register 17 that stores the self-address therein. When the address information coincides with the value, the interrupt request signal intreq is asserted.

The message ID analysis unit 19 inputs the message identification information ID within the packet pac and a value of the message ID register group 202, and outputs the message ID analysis result signal sigb that determines whether the packet is a specific message packet, or not.

The ALU 30 selects the data "data" within the packet pac and one data of the reference data register group 24, inputs both of data, conducts arithmetic operation, and outputs the arithmetic result data3. The arithmetic result data3 and the data "data" within the packet are inputted to the selector 33. The selector 33 inputs the message ID analysis result signal sigb as a selected signal, and outputs any one of the arithmetic result "data3" and the data within the packet as "data4". That is, the arithmetic result is selected in the case of the specific ID packet, and the data within the received packet is selected in the case of the ordinary packet. As described above, the load on the CPU 5 can be reduced by allowing a part of the process (arithmetic operation) after receiving the packet by the CPU 5 to be conducted by the ALU 30.

Figure 8:
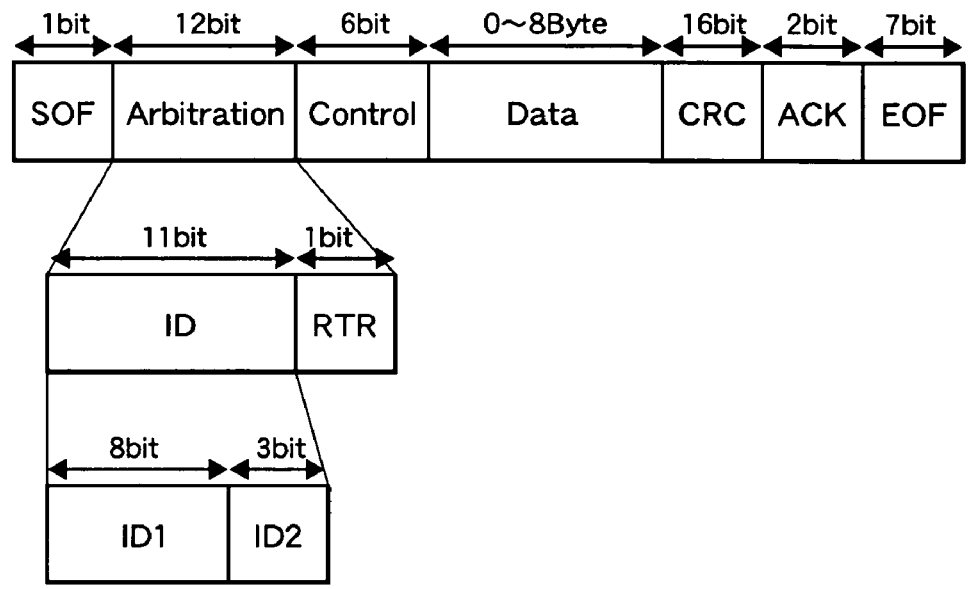
FIG. 8 is a diagram for explaining a first packet example used in the embodiment of the present invention.

Hereinafter, a description will be given in more detail of various structural examples of the packets used in the above respective embodiments and modifications of the packets. A packet shown in FIG. 8 is a first packet example corresponding to the communication packet pac2 used in the second embodiment, and has no address information but a message ID given as inherent information for each of the messages. The packet defines an ID field indicative of a packet that conducts a specific process of the present invention within an ID field of a standard data frame of CAN. The data frame of CAN is made up of SOF of 1 bit indicative of a start position, an Arbitration field of 12 bits, a Control field of 6 bits including a code indicative of a data length and a reservation bit, a Data field of 0 to 8 Bytes, a CRC field of 16 bits for checking a transfer error of the frame, an ACK field of 2 bits, and an EOF field of 7 bits. The Arbitration field is made up of an ID field of 11 bits and an RTR field of 1 bit.

The RTR field is a flag of 1 bit for designating a remote frame that requests data transmission or a data frame that transmits data. In the case of the data frame, the RTR field is set to 0. An ID area is message identification information given to the individual messages. The CAN is not a communication method that designates a receiving address by a transmission node side, but a method in which a receiving node retains ID that is received by the subject microprocessor, and the receiving node receives only the received message necessary for the subject microprocessor. This method belongs to the communication method described in the second embodiment. In the present invention, the ID field of 11 bits is further divided into an IDI field of 8 bits and an ID2 field of 3 bits for use.

The receiving node determines whether the packet should be received, or not, with the use of the ID1 field by comparison with the message ID register group 202 described in the second embodiment. The receiving node further determines whether the package is a specific message packet, or not, with the use of the ID2 field. With the above operation, the message ID analysis result signal sigb in the second embodiment can be produced. For example, in the ordinary message, the ID2 field is set to (000), and the message that conducts the specific process includes 1 in any one of those 3 bits. As a result, seven kinds of specific process messages can be set. In the receiving node, the message ID analysis result signal sigb shown in the second embodiment can be produced by a simple determination method that determines whether the ID2 field is (000), or not.

Figure 9:
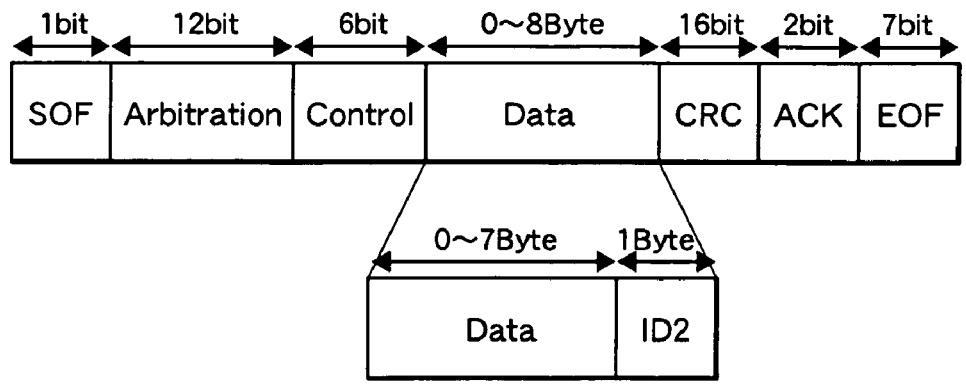
FIG. 9 is a diagram for explaining a second packet example used in the embodiment of the present invention.

Subsequently, FIG. 9 shows a second packet example in which the communication packet pac2 used in the second embodiment is modified. The packet shown in FIG. 9 is a standard data frame of CAN as with the packet shown in FIG. 8. In the second example, 1 Byte within the Data field is used in the ID2 field for recognizing that the message conducts the specific process. In the case where 11 bit of the message ID cannot be freely set, or in the case where the number of specific process messages is intended to be increased, the second example is better than the first example. However, because 1 Byte of the Data field is used, the data transfer efficiency is deteriorated. Even in the ordinary message, 1 Byte of the Data field must be sacrificed.

Figure 10:
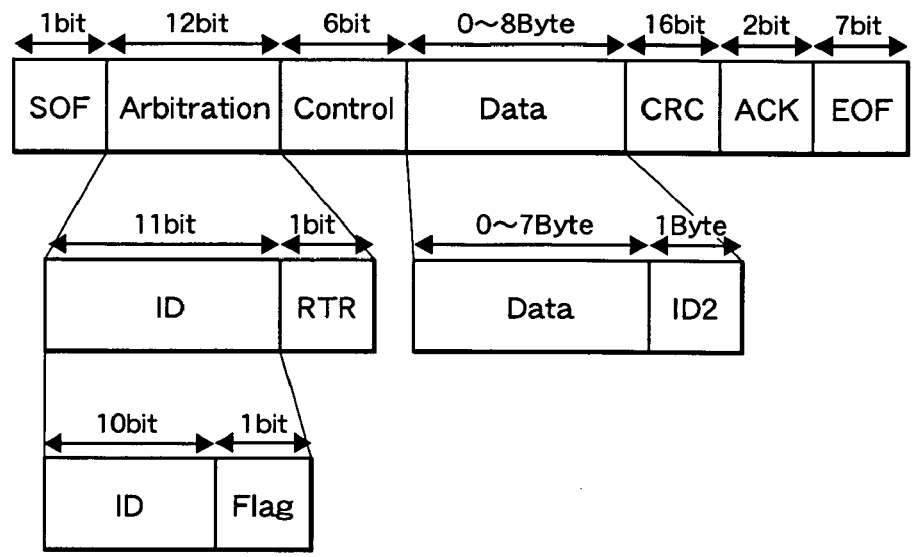
FIG. 10 is a diagram for explaining a third packet example used in the embodiment of the present invention.

Subsequently, FIG. 10 shows a third packet example in which the communication packet pac2 used in the second embodiment is modified. The third example shown in FIG. 10 is a standard data frame of CAN as in FIGS. 8 and 9. In the third example, 1 Byte within the Data field is used in the ID2 field for recognizing that the message conducts the specific process as in the second example. In addition, the Flag field indicating whether the message is the specific message, or not, is disposed by using 1 bit of the ID field. As a result, in the ordinary message, 1 Byte of the Data field is not useless.

Figure 11:
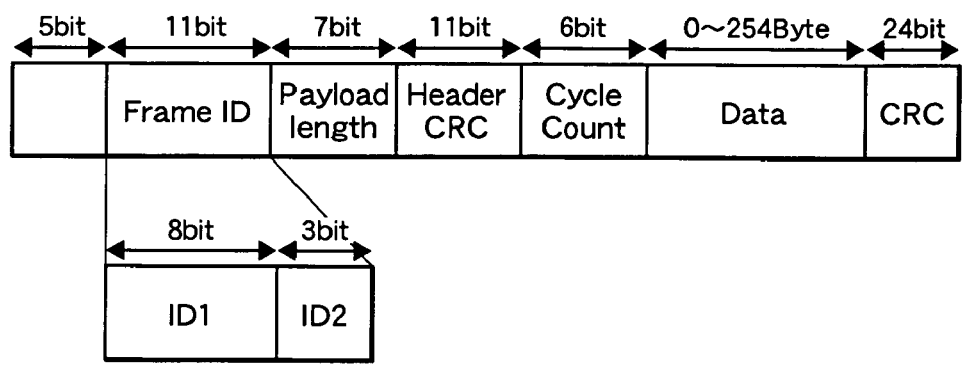
FIG. 11 is a diagram for explaining a fourth packet example used in the embodiment of the present invention.

In addition, FIG. 11 shows a fourth packet example corresponding to the communication packet pac2 used in the second embodiment. A packet shown in FIG. 11 is a frame of "FlexRay" which is another communication standard different from that of CAN. The "FlexRay" is a data rate higher than that of CAN, and the communication standard that is planned to be applied to a future in-vehicle LAN. The frame of FlexRay includes a field of 5 bits in total, each bit of which constitutes a reserve bit, a Payload preamble indicator, a Null frame indicator, a Sync frame indicator, and a Startup frame indicator, which are omitted from FIG. 11. The frame of FlexRay also includes a frame ID field of 11 bits, a Payload length field of 7 bits, a Header CRC of 11 bits, a Cycle count field of 6 bits, a Data field of 254 Bytes at the maximum, and a CRC field of 24 bits.

The fourth example uses 3 bits of the Frame ID field in the ID2 field for recognizing that the message conducts the specific process, as in the first example. As in the first example, the receiving node determines whether the packet is the specific message packet, or not, with the use of the ID2 field, so as to generate the message ID analysis result signal sigb in the second embodiment.

Figure 12:
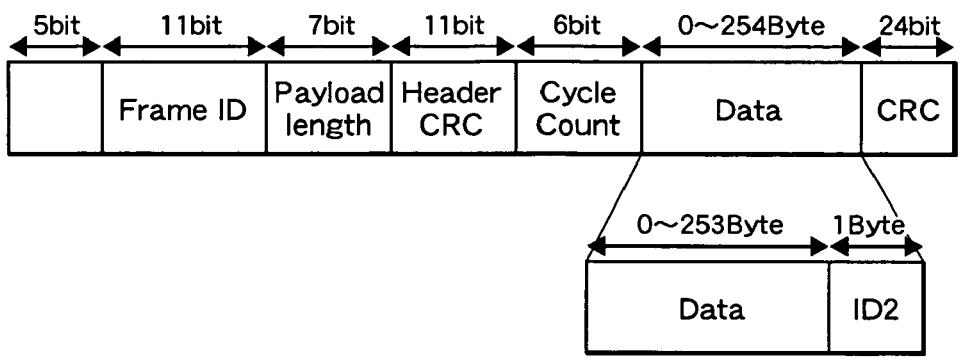
FIG. 12 is a diagram for explaining a fifth packet example used in the embodiment of the present invention.

Subsequently, FIG. 12 shows a fifth packet example in which the communication packet pac2 used in the second embodiment is modified. The packet shown in FIG. 12 is a frame of FlexRay as with the packet shown in FIG. 11. In the fifth example, 1 Byte within the Data field is used for the ID2 field for recognizing that the message conducts the specific process, as with the CAN data frame of the second example. In the case where 11 bit of the message ID cannot be freely set, or in the case where the number of specific process messages is intended to increase, the fifth example is better than the fourth example. However, because 1 Byte of the Data field is used, the data transfer efficiency is deteriorated. Even in the ordinary message, 1 Byte of the Data field must be sacrificed.

Figure 13:
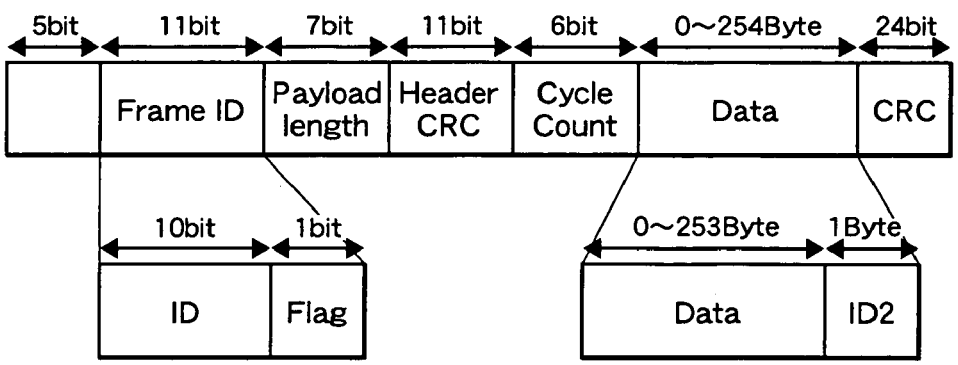
FIG. 13 is a diagram for explaining a sixth packet example used in the embodiment of the present invention.

Subsequently, FIG. 13 shows a sixth packet example in which the communication packet pac2 used in the second embodiment is modified. The packet shown in FIG. 13 is a frame of FlexRay as with the packet shown in FIGS. 11 and 12. In the sixth example, 1 Byte within the Data field is used for the ID2 field for recognizing that the message conducts the specific process, as with the fifth packet. In addition, a Flag field indicating whether the packet is the specific message, or not, is provided with the use of 1 bit of the frame ID field. As a result, in the ordinary message, 1 Byte of the Data field is not useless.

Figure 14:
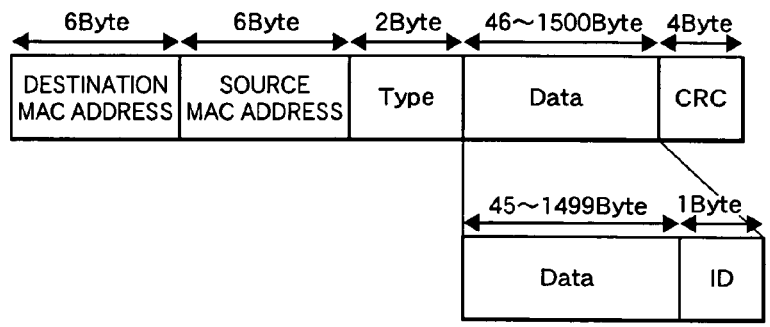
FIG. 14 is a diagram for explaining a seventh packet example used in the embodiment of the present invention.
Figure 15:
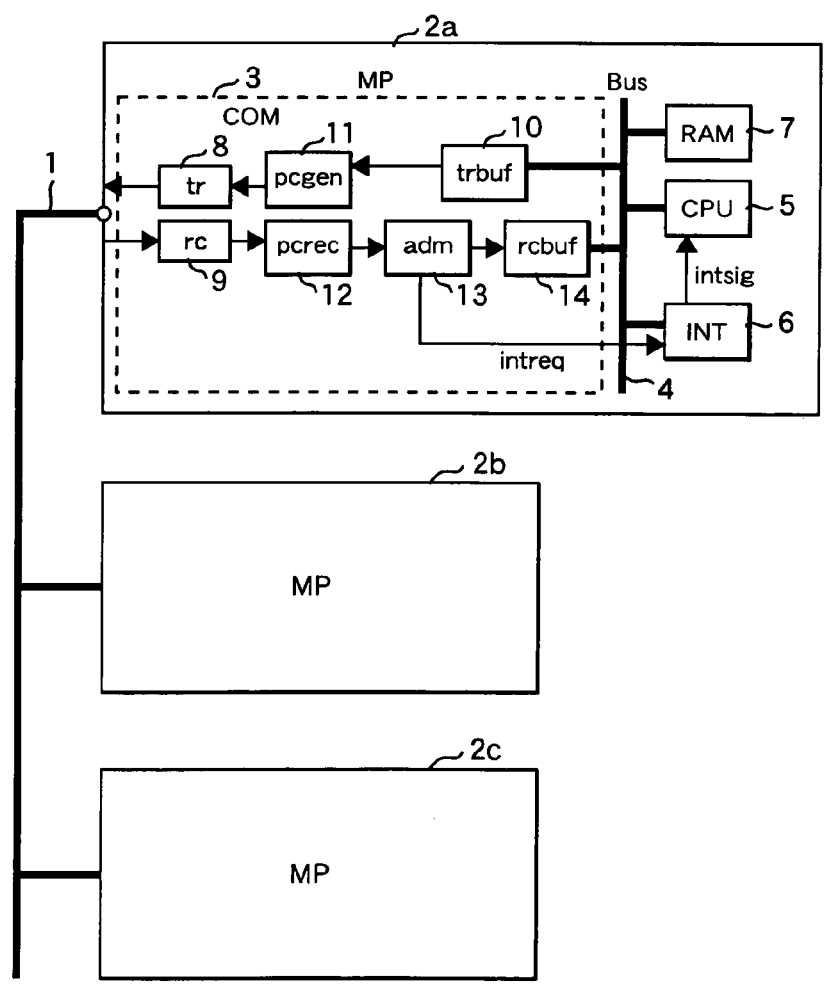
FIG. 15 is a structural diagram for explaining a communication module of a microprocessor and a network system in the related art.
Figure 16:
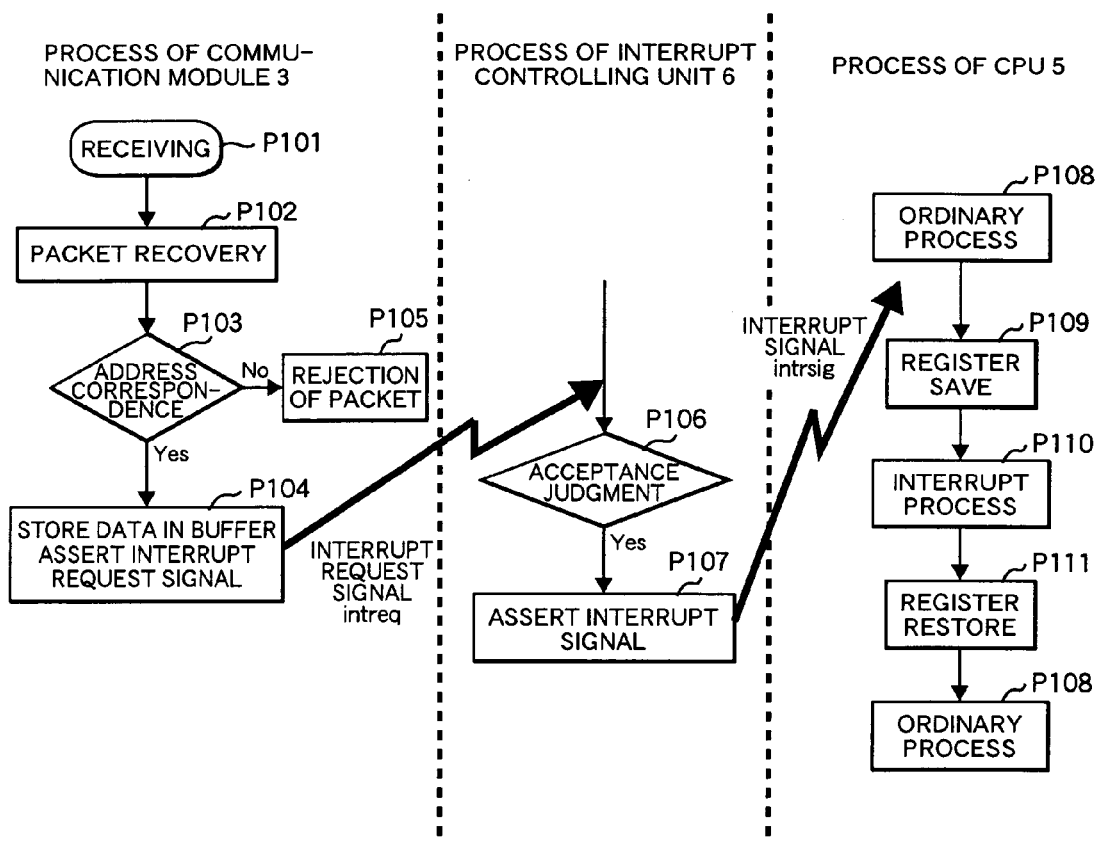
FIG. 16 is a flowchart for explaining a conventional communication method.

In addition, FIG. 14 shows a seventh packet example in which the communication packet used in the first and third to fifth embodiments is modified. The packet shown in FIG. 14 is a frame structure of Ethernet Ver.2 of TCP/IP. This structure is provided with a field of the destination address which is different from the frame of the CAN or FlexRay. The frame of Ethernet Ver. 2 is made up of a destination MAC address field of 6 Bytes, a source MAC address field of 6 Bytes, a type field of 2 Bytes, a Data field of 46 to 1500 Bytes, and a CRC field of 4 Bytes for checking the transfer error of the frame.

The frame of that type is used in a communication method that designates a receiving address in the frame, and the receiving node checks the correspondence of the self-address with the received address, and receives only the receiving message necessary for the subject microprocessor. This method belongs to the communication method described in the first embodiment. The receiving node determines whether the packet is a message packet that conducts a specific process with the use of an ID field provided by using an area of 1 Byte within the Data field, and generates the message ID analysis result signal sigb in the first and third to fifth embodiments.

According to the present invention, there can be realized a microprocessor that is low in a load on the CPU and high in the efficiency.

It is further understood by those skilled in the art that the foregoing description is a preferred embodiment of the disclosed device and that various changes and modifications may be made in the invention without departing from the spirit and scope thereof.

What is claimed is:

1. A microprocessor having a communication module that conducts transmission/reception using packets through a network, and a CPU that processes data included in the packets received by the communication module, the communication module comprising:

a register that stores first information that is managed by the microprocessor; and a comparator that compares second information at a given bit position within the received packet with the first information stored in the register to conduct a first determination of whether the CPU processes the data, or not, according to a comparison result, wherein the communication module generates an interrupt request signal with respect to the CPU when the comparator conducts the first determination that the CPU processes the data, and wherein the communication module comprises a process determination unit that inputs a first result that conducts the first determination, a second result that conducts a second determination of whether the packet is addressed to a subject microprocessor, or not, with reference to address information included in the packet, and a third result that conducts a third determination of whether the interrupt request signal is generated with reference to the message identification information included within the packet not depending on the first determination result, or the process is selected on the basis of the first determination result, and conducts a packet reply when both of the first result and the second result are affirmative, and the third result is that the process is selected on the basis of the first determination result.

2. The microprocessor according to claim 1, wherein the first information comprises information that is managed and updated by the CPU.

3. The microprocessor according to claim 1, wherein the communication module transmits a reply packet indicating that the data is processed when the comparator conducts the first determination that the CPU processes the data.

4. The microprocessor according to claim 1, wherein the communication module selects any one of three processes including a packet rejection, an interrupt request signal generation, and a packet reply and executes the selected process.

5. The microprocessor according to claim 1, wherein the address information is stored in a header portion within the packet, and the second information is stored in a payload portion within the packet.

6. A microprocessor having a communication module that conducts transmission/reception using packets through a network, and a CPU that processes data included in the packets received by the communication module, the communication module comprising:

a register that stores first information that is managed by the microprocessor; and a comparator that compares second information at a given bit position within the received packet with the first information stored in the register to conduct a first determination of whether the CPU processes the data, or not, according to a comparison result, wherein the communication module generates an interrupt request signal with respect to the CPU when the comparator conducts the first determination that the CPU processes the data, and wherein the communication module comprises a process determination unit that inputs a first result that conducts the first, determination, a second result that conducts a second determination of whether the packet is addressed to a subject microprocessor, or not, with reference to a first bit group of message identification information included in the packet, and a third result that conducts a third determination of whether the interrupt request signal is generated with reference to a second bit group in the message identification information not depending on the first determination result; or the process is selected on the basis of the first determination result, and conducts a packet reply when both of the first result and the second result are affirmative, and the third result is that the process is selected on the basis of the first determination result.

7. The microprocessor according to claim 6, wherein the address information is stored in a header portion within the packet, and the second information is stored in a payload portion within the packet.

8. The microprocessor according to claim 4, wherein the communication module includes a processing method determination register that designates any one of the packet rejection, the interrupt request signal generation, and the packet reply to be selected according to the comparison result.

9. A network system, comprising:

a network; and a plurality of microprocessors that are connected to the network, wherein each of the plurality of microprocessors comprises a communication module that conducts transmission/reception using packets through the network, and a CPU that processes data included in the packets received by the communication module, wherein the communication module comprises a register that stores first information managed by the microprocessor, and a comparator that compares second information at a given bit position within the received packet with the first information stored in the register to conduct a first determination of whether the CPU processes the data, or not, according to a comparison result, wherein when a first microprocessor among the plurality of microprocessors requests a second microprocessor to execute a task, the first microprocessor transmits the packet to the second microprocessor, and the data included in the packet is data of the task execution request, wherein the communication module of the second microprocessor generates an interrupt request signal with respect to the CPU when the comparator conducts the first determination that the CPU processes the data, and wherein the communication module comprises a process determination unit that inputs a first result that conducts the first determination, a second result that conducts a second determination of whether the packet is addressed to a subject microprocessor, or not, with reference to address information included in the packet, and a third result that conducts a third determination of whether the interrupt request signal is generated with reference to message identification information included within the packet not depending on the first determination result, or the process is selected on the basis of the first determination result, and conducts a packet reply when both of the first result and the second result are affirmative, and the third result is that the process is selected on the basis of the first determination result.

10. The network system according to claim 9, wherein the communication module of the second microprocessor transmits a reply packet indicating that the data is processed when the comparator conducts the first determination that the CPU processes the data.

11. The network system according to claim 9, wherein the communication module of the second microprocessor selects any one of three processes including a packet rejection, an interrupt request signal generation, and a packet reply to the first microprocessor and executes the selected process.

12. The network system according to claim 9, wherein the communication module comprises a process determination unit that inputs a first result that conducts the first determination, a second result that conducts a second determination of whether the packet is addressed to a subject microprocessor, or not, with reference to a first bit group of message identification information included in the packet, and a third result that conducts a third determination of whether the interrupt request signal is generated with reference to a second bit group in the message identification information not depending on the first determination result, or the process is selected on the basis of the first determination result, and conducts a packet reply when both of the first result and the second result are affirmative, and the third result is that the process is selected on the basis of the first determination result.

13. A communication method, comprising the steps of:

mutually transmitting and receiving data among a plurality of nodes that are connected to a network, each of the plurality of nodes including a communication module that conducts the transmission/reception with respect to the network by using packets, and a CPU that is connected to the communication module; and processing data included in the packet received by the communication module by the CPU, wherein the received packet includes an information bit group that requests to conduct a packet reply directly from the communication module not through the CPU wherein the information bit group represents message identification information of a task execution request, and wherein in the communication module, when it is determined that the task of the task execution request is a task that is to be executed by a self-node, and it is determined that the task is executable by the self-node, an interrupt request signal to the CPU is generated.

* * * * *

UNITED STATES PATENT AND TRADEMARK OFFICE
CERTIFICATE OF CORRECTION

PATENT NO. : 7,602,779 B2 Page 1 of 1
APPLICATION NO. : 11/211573
DATED : October 13, 2009
INVENTOR(S) : Kato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1083 days.

Signed and Sealed this

Fifth Day of October, 2010

David J. Kappos
*Director of the United States Patent and Trademark Office*